United States Patent [19]

Sandefur

[11] 4,376,332
[45] Mar. 15, 1983

[54] TOOL FOR REPAIRING AND REPLACING DAMAGED STUDS

[76] Inventor: Don J. Sandefur, 818 E. Water St., Tucson, Ariz. 85719

[21] Appl. No.: 257,382

[22] Filed: Apr. 24, 1981

[51] Int. Cl.³ .............................................. B23P 7/04
[52] U.S. Cl. ............................. 29/402.08; 408/1 R; 411/412; 411/388; 403/11; 403/408; 29/402.17
[58] Field of Search ................... 411/412, 388; 403/11, 403/408; 408/1; 285/281, 276; 29/402.08, 402.09, 402.11, 402.12, 402.15, 402.17

[56] References Cited

U.S. PATENT DOCUMENTS 1,905,665  4/1933  Weatherhead, Jr. et al. ......... 408/1
2,407,904  9/1946  Rosan .............................. 29/402.08
3,527,486  9/1970  Gamp ................................... 403/11
3,619,892  11/1971  Roeschlauf ...................... 29/402.12

Primary Examiner—Francis S. Husar
Assistant Examiner—V. K. Rising
Attorney, Agent, or Firm—Drummond, Nelson & Nissle

[57] ABSTRACT

A replacement stud for an original stud damaged in existing equipment consists of an oversized section having a threaded diameter larger than the original stud and a nominal section having a threaded diameter identical to that of the original stud. The nominal section is topped by a frangible, necked-down diameter capped by a suitable drive head for use with conventional hand or power drive tools. When the original stud has been damaged so as to preclude removal of a segment of it from the original stud hole, the stud hole is counter-drilled, enlarging its diameter and eliminating the broken segment. The larger threaded diameter of the snap-stud invention is set by the original stud's threaded diameter and the drill size predetermined for counter-drilling the original stud hole.

1 Claim, 11 Drawing Figures

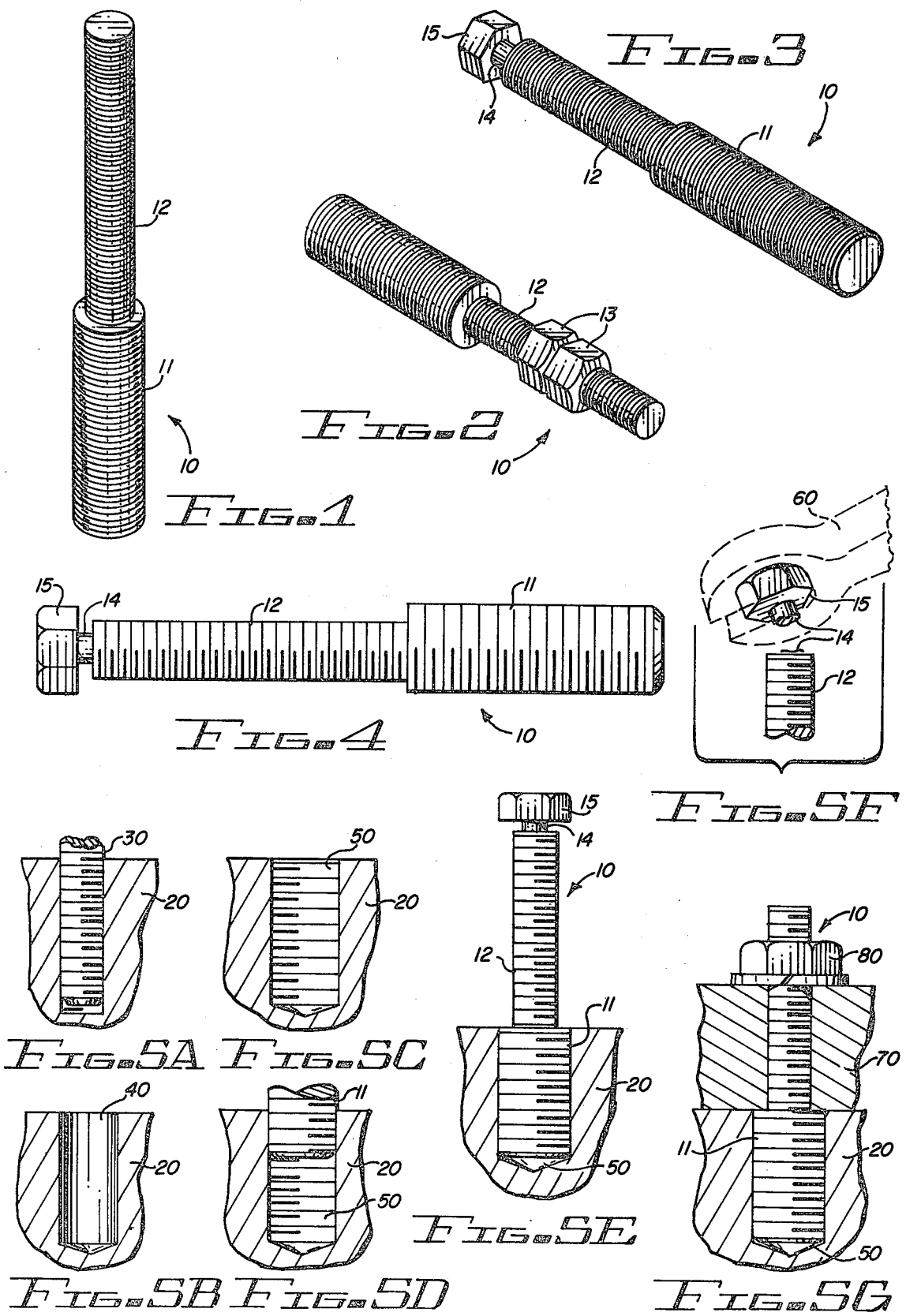

TOOL FOR REPAIRING AND REPLACING DAMAGED STUDS

BACKGROUND OF THE INVENTION

1. Field of the Invention

The invention relates to methods and apparatus for replacing studs damaged after emplacement in existing equipment.

In another respect, the invention relates to a method and apparatus for replacing damaged studs wherein the threaded diameter of the original stud is retained so that no modification of clearance hole diameters is required on the part held by said original stud.

In yet another respect, the invention relates to a method and apparatus for replacing a damaged stud whereby the replacement stud may be emplaced at proper torque levels using conventional, non-specialized tools.

In a more particular aspect, the invention relates to the use of a replacement stud having a first threaded segment identical to that of the original stud and a second threaded segment whose diameter is predetermined by the size of the drill selected to counterdrill the damaged stud from the original stud hole.

In a still more particular aspect, the invention relates to a dual diameter replacement stud having a frangible, necked-down diameter surmounted by a suitable drive head for use with conventional, hand or power drive tools such that the drive head will snap from the replacement stud when the replacement stud is emplaced in the equipment at the proper torque level.

2. Description of the Prior Art

Prior art techniques for replacing damaged studs usually take one of two approaches. In one, a hole smaller in diameter than that of the original stud is drilled through the damaged stud along its central axis. A special form of tap, having a left-hand thread, is then driven down into the drilled hole. When the tap bottoms out, the operator continues turning the tap, which action now tends to ease the broken segment of the original stud out of the stud hole. A new "original equipment" stud may then be used to make the necessary repair.

Unfortunately, most repair facilities find themselves without such specialized stud removal taps. These left-handed tools are relatively expensive, they must be stocked in multiple sizes, and they are prone to breakage while in use in easing the broken stud segment out of the stud hole. This compounds the repair job since these taps are of hardened steel and counterdrilling them is much more difficult than drilling down through a broken stud segment.

Most repair facilities take another approach. The broken stud segment is counterdrilled using a drill having a larger diameter than that of the original stud. This removes the broken segment, but also enlarges the stud hole. This larger hole is then tapped and a new, but larger diameter, stud is emplaced in the hole.

This latter approach leads to additional problems, however. Assume the oversized replacement stud was installed in the wheel hub of a car. The car wheel is held in place on the hub by passing the hub studs through clearance holes in the wheel and then fastening the hub and wheel together using wheel nuts threaded onto the hub studs. But, with an oversized stud in the hub, the wheel cannot be mounted because the new stud will not clear the wheel mounting holes. If one of the wheel holes may be safely enlarged, which, in itself, is problematical, the wheel and hub may be assembled, but proper orientation must now be observed. Also, the wheel is now specialized for use solely with that particular hub and has lost its former versatility.

SUMMARY OF THE INVENTION

It would be highly desirable to overcome the shortcomings of the prior art apparatus and techniques and provide improved means and methods for replacing damaged studs. This is the principal object of the invention.

Another principal object of the invention is that of providing an improved replacement stud which retains the original stud's diameter on that segment of the stud which remains exposed after the stud is emplaced.

Still another object of the invention is the provision and use of a dual diameter stud wherein the smaller diameter is that of the original stud and the larger diameter is that determined by the original stud's diameter and the drill preselected to counterdrill the damaged, original stud segment from its stud hole.

A further object of the invention is providing means and method for emplacing the replacement stud into its stud hole at proper torque levels using conventional, non-specialized tools.

More specifically, it is an object of the invention to provide a replacement stud having a drive head suitable for use with hand or power drive tools, which drive head is affixed to said stud by a frangible section which fractures, causing the drive head to separate from the replacement stud, when a preselected drive torque range has been achieved.

In summary, therefore, the invention may be described as a dual diameter replacement stud having its smaller threaded diameter surmounted by a frangible section to which is attached a suitable drive head to permit the use of conventional hand or power drive tools therewith. The smaller threaded diameter duplicates that of the original stud to be replaced. The larger threaded diameter is established by the threaded diameter of the original stud and by the drill diameter preselected to counterdrill the broken segment of the original stud from its stud hole.

The method of replacement of the damaged stud involves counterdrilling the original stud's broken segment from its stud hole; tapping the now enlarged stud hole so as to accept the larger threaded diameter of a replacement stud such as that described above, emplacing said replacement stud in said newly tapped stud hole and torqueing same until the drive head snaps off as a result of fracture of the frangible section.

The objects and advantages of the invention will be apparent to those skilled in the art from the following detailed description thereof, taken in conjunction with the drawings.

BRIEF DESCRIPTION OF THE DRAWINGS

FIG. 1 illustrates a dual diameter stud with the diameters selected in accord with the teachings herein;

FIG. 2 shows the manner in which the dual diameter stud may be emplaced or removed using two machine-threaded nuts, back-to-back, on one threaded segment of the stud;

FIG. 3 is a perspective view indicating the dual diameter stud with a frangible "snap section" and a conventional drive head. A hex-head drive is shown for illustration only and is not meant to limit the choice of drive head selected;

FIG. 4 is a plan view of the "snap-stud" of FIG. 3;

FIGS. 5A-5G illustrate the steps employed in practicing the method of the invention taught herein.

DESCRIPTION OF THE INVENTION

When two members are to be held together, conventional bolts or threaded studs and nuts are typically employed to maintain the two members in place. In either case, one member bears one or more threaded holes while the other member has an equal number of clearance holes. Should a threaded hole become damaged or a stud or bolt become broken off in the threaded hole, the decision is often made to clean the hole by drilling it to clear it of the damaged threads or the broken stud or bolt segment.

Of the two members to be so held together, it often happens that there is not a sufficient margin of metal around the clearance holes to allow them to be drilled to a larger size as was possible with the threaded hole in the operation described above. Or, if there is sufficient margin for drilling out the clearance hole, the resultant member with its single oversized clearance hole introduces orientation problems in assembly and may provide advserse safety effects in the use of the assembled members.

The use of the dual diameter stud 10 illustrated in FIG. 1 eliminates these problems. When the threaded hole in the holding member is drilled to clear out the damaged threads or the broken bolt or stud segment, it is retapped to accept the larger-threaded diameter segment 11 of stud 10. The smaller-threaded diameter segment 12 corresponds to that of the original stud or bolt thread diameter and will be accepted readily by the original clearance holes in the member to be held (the held member).

As an example, and not by way of limitation, the original bolt or stud may have a thread diameter of ⅜" and the oversized stud hole a diameter to be retapped for a 7/16" thread.

The dual diameter stud may be driven into the tapped hole in the holding member using two threaded nuts 13 placed back-to-back on the smaller diameter segment 12 of stud 10. This arrangement, FIG. 2, permits the use of conventional tools to drive or remove the stud without damage to its threaded surfaces.

In the embodiment of FIG. 3, a frangible, necked-down diameter 14 is located between one end of threaded segment 12 and drive head 15. The frangible section will fracture when the torsional forces applied to drive head 15 exceed a preselected value. Thus, conventional hand or power drive tools may be utilized to emplace stud 10 into a tapped hole, and tighten it therein (bottoming it) within a preselected torque range.

FIG. 5 illustrates the methodical steps to follow in replacing a broken stud or bolt with a dual diameter snap-stud such as that illustrated in FIG. 4.

FIG. 5A illustrates a part of holding member 20 with a broken stud segment 30 emplaced therein. Using standard good practices, broken stud 30 is removed by counterdrilling to produce a clean bore 40, FIG. 5B. Bore 40 is tapped 50, FIG. 5C, so as to accept threaded segment 11 of dual diameter snap-stud 10.

Threaded segment 11 of stud 11 of stud 10 is started into retapped hole 50, FIG. 5D, and a conventional drive tool, such as wrench 60 illustrated in phantom outline in FIG. 5F, is utilized to drive stud 10 into member 20 until it bottoms out in retapped hole 50, FIG. 5E. Continued application of torsional drive force by, e.g., wrench 60 results in fracture of frangible section 14 and the removal of drive head 15 from stud 10, FIG. 5F.

Held member 70 is then affixed to holding member 20 by assembling the members as shown in FIG. 5G and using a fastener such as threaded nut 80 to maintain the two members together.

A study and an understanding of the steps illustrated in FIGS. 5A-5F makes it clear as well how the embodiment of FIG. 2 using two threaded nuts mounted back-to-back on stud 10 may be used to effect a repair of a damaged stud or bolt. However, the embodiment of FIG. 2 has no provision for establishing proper torque in setting the stud using conventional non-specialized drive tools.

Having described the method and apparatus for effecting the repair of broken studs or bolts in such a clear and concise manner as to enable those skilled in the art to understand and practice the invention, I claim:

1. A method for repairing the effects of a broken in-place stud or bolt by use of a dual diameter replacement stud comprising the steps of:
    (a) selecting a dual diameter replacement stud having its smaller diameter identical to that of the broken stud or bolt;
    (b) determining the counterdrill size and the tap for the larger diameter of said dual diameter stud was manufactured for making repairs where studs or bolts are broken in-place;
    (c) counterdrilling the stud or bolt hole containing the broken segment of the original stud or bolt using the size drill preselected for said purpose as determined in step (b);
    (d) retapping said counterdrilled hole using the size tap preselected for said purpose as determined in step (b); and
    (e) driving the larger threaded diameter of said dual diameter replacement stud into said counterdrilled, retapped hole so as to effect the necessary repair.

* * * * *

UNITED STATES PATENT AND TRADEMARK OFFICE
CERTIFICATE OF CORRECTION

PATENT NO. : 4,376,332

DATED : March 15, 1983

INVENTOR(S) : DON J. SANDEFUR

It is certified that error appears in the above-identified patent and that said Letters Patent are hereby corrected as shown below:

In Claim One, part (b) delete "was".

Signed and Sealed this

Twenty-first Day of June 1983

[SEAL]

Attest:

DONALD J. QUIGG

Attesting Officer     Acting Commissioner of Patents and Trademarks